United States Patent [19]

Sansum

[11] 4,218,648
[45] Aug. 19, 1980

[54] ARRANGEMENT FOR REDUCING NO-LOAD CURRENT IN AN ENERGIZED TRANSFORMER

[76] Inventor: Victor H. Sansum, P.O. Box 11805, Palo Alto, Calif. 94306

[21] Appl. No.: 971,027

[22] Filed: Dec. 19, 1978

[51] Int. Cl.² .............................................. G05F 3/00
[52] U.S. Cl. ............................. 323/18; 307/252 UA; 323/24
[58] Field of Search .................. 307/252 UA; 323/18, 323/24, 25

[56] References Cited

U.S. PATENT DOCUMENTS

| | | | |
|---|---|---|---|
| 3,372,328 | 3/1968 | Pinckaers | 323/24 X |
| 3,902,080 | 8/1975 | St. Clair et al. | 307/252 B |
| 4,024,457 | 5/1977 | Riddle | 307/252 UA X |

*Primary Examiner*—William M. Shoop

[57] ABSTRACT

A two-terminal control and power switching circuit for substantially reducing electric current flow in the primary winding of an energized power transformer when no load is connected to the transformer secondary. A triac, in series with the power transformer primary and AC source, remains off when a load remains unconnected to the secondary of the power transformer. An oscillator circuit causes a resistive path to be periodically connected across the nonconducting triac. When a load is connected across the power transformer secondary, the resulting increase in voltage developed across a portion of this resistive path is sufficient to cause voltage-amplitude-sensing circuitry to fire the triac. After the triac is turned on by this voltage-amplitude-sensing circuit, conduction of the triac is maintained by a feedback arrangement whereby a low-impedance, current-sampling transformer, having its primary winding also in series with the triac, power transformer primary winding, and AC source, delivers lagging current from its secondary winding to the input terminals of the triac, with amplitude sufficient to fire the triac after every zero-crossing of the AC source voltage as long as the load remains connected to the power transformer secondary. When the electrical load on the power transformer secondary is removed, the magnitude of the current flowing through the current-sampling transformer falls below the level required to fire the triac, and the triac ceases to conduct at the next zero-crossing.

11 Claims, 9 Drawing Figures

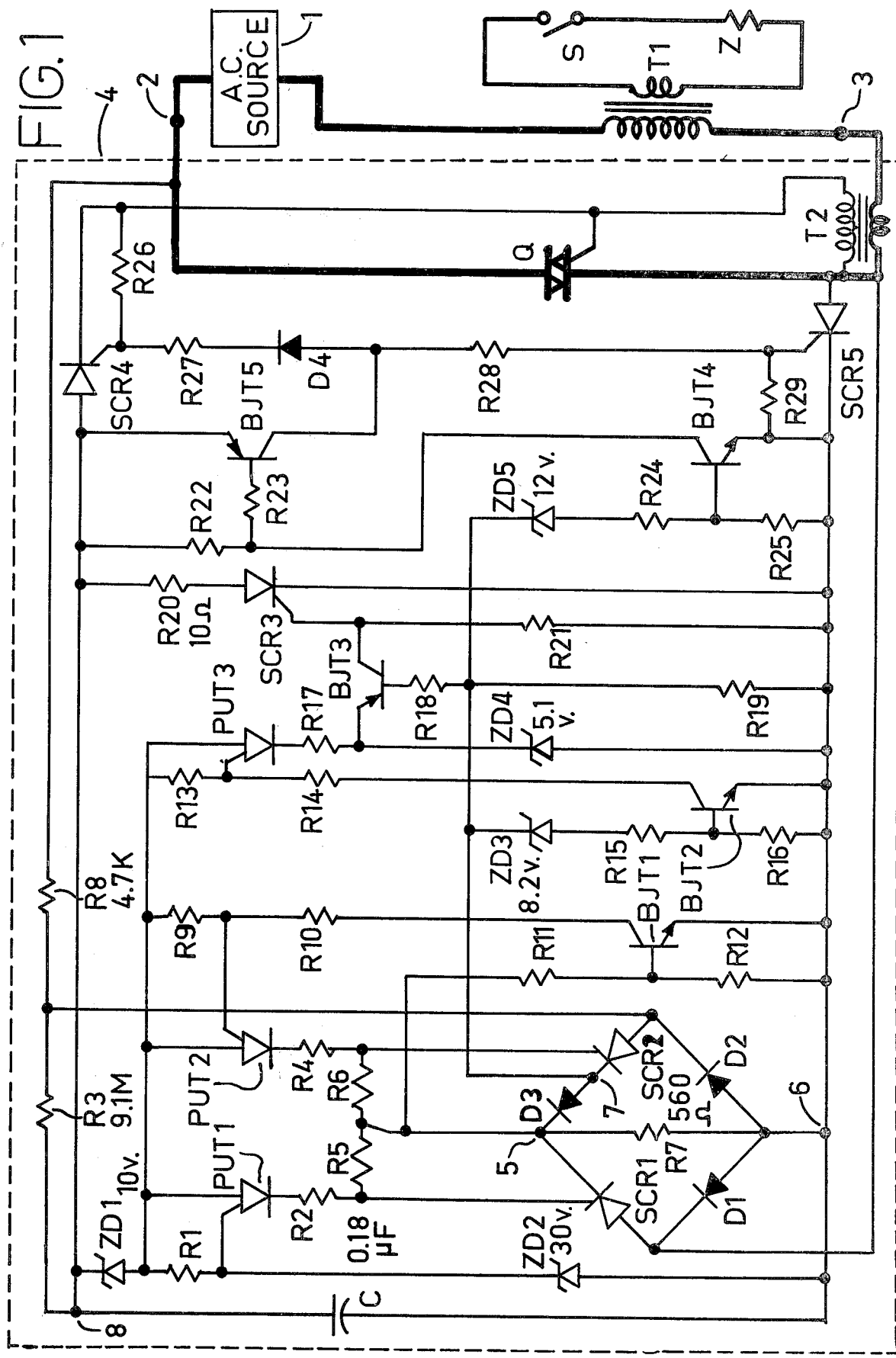

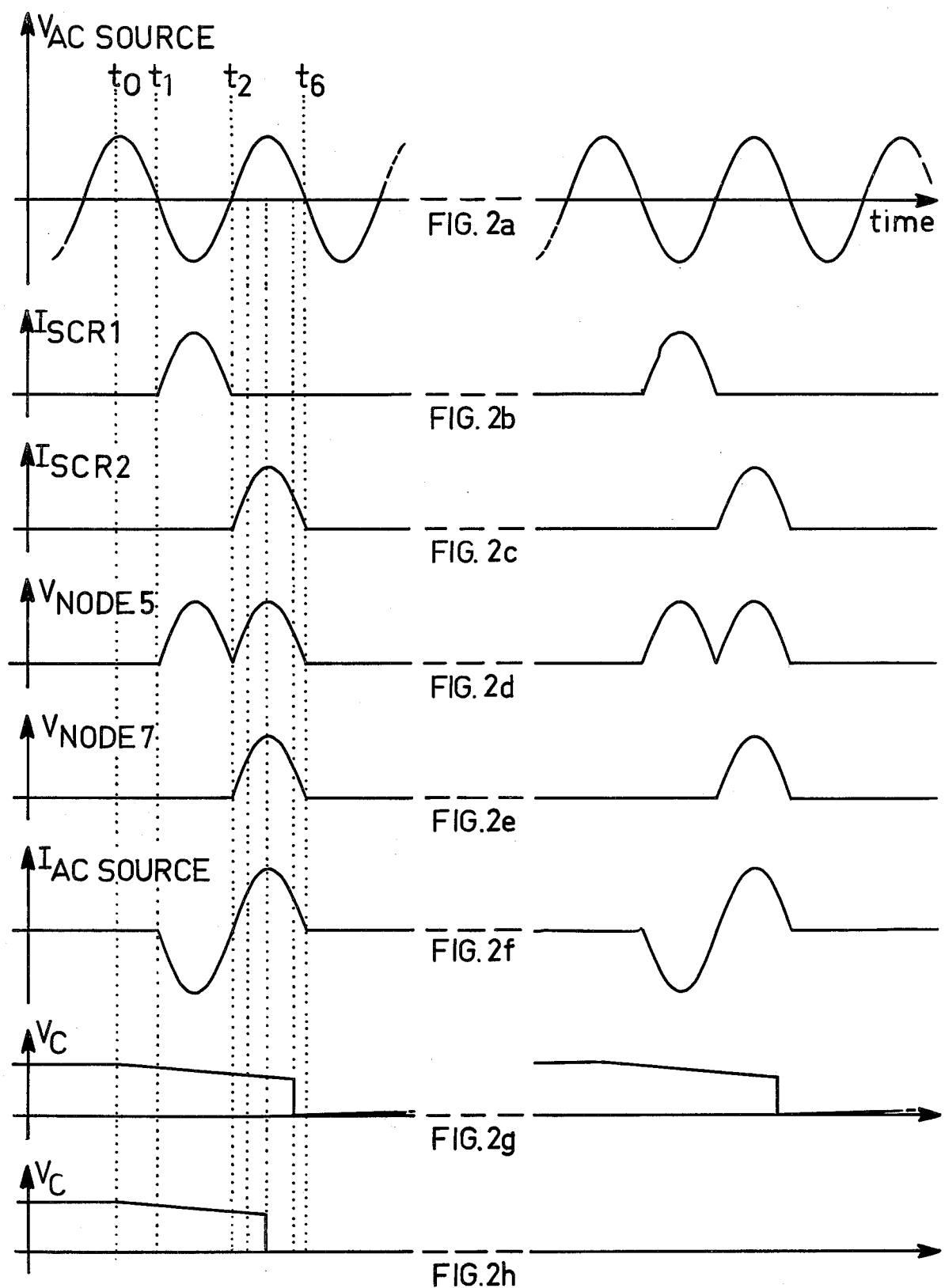

ARRANGEMENT FOR REDUCING NO-LOAD CURRENT IN AN ENERGIZED TRANSFORMER

BACKGROUND OF THE INVENTION

Transformers permanently connected to power lines for the purpose of powering doorbells, home heating and cooling controls, and the like, dissipate a significant amount of energy during intervals when these transformers are not delivering power to their intermittently-connected loads. This invention substantially reduces current flow during intervals when the secondary winding of such an energized transformer is not connected to an electrical load.

A first object of this invention is to interrupt the flow of current to the primary side of the transformer when the transformer secondary is disconnected from the load.

A second object of this invention is to sense, with circuitry connected only on the primary side of said transformer, the presence of a load on the secondary side.

A third object of this invention is to connect the transformer primary to the power source when a load on the secondary has been sensed.

A fourth object of this invention is to achieve the above-listed objectives with a two-terminal circuit to minimize the cost of installing this invention in electrical systems.

A fifth object of this invention is to achieve the above-listed objectives with no reduction in isolation between primary and secondary sides of the transformer.

A sixth object of this invention is to achieve the above-listed objectives with a circuit configuration that will facilitate the inclusion of most elements of the invention within an inexpensive monolithic microcircuit.

SUMMARY OF THE INVENTION

The presence of an electrical load on the secondary of a permanently connected power transformer is tested for, at regular intervals (e.g., once each half second), by sensing the occurrence of an increase in current in a resistive path which is periodically connected in series with the power transformer primary and AC source. This connection is made by a pair of silicon controlled rectifiers included in a gate circuit controlled by an RC oscillator. Said resistive path is maintained only long enough to permit one cycle of current to flow from the AC source during each cycle of said RC oscillator. The peak voltage drop across a portion of said resistive path is large enough, if a load is present on the power transformer secondary, to cause amplitude-sensing circuitry to fire a triac, said triac connecting said power transformer to said AC source. The capacitor of said RC oscillator circuit, when charged, also serves as the energy source required to fire said triac. Once said triac has fired, a low-impedance current-sampling transformer, having its primary winding also in series with said triac, said power transformer, and said AC source, provides lagging current from its secondary winding sufficient to trigger said triac into conduction at all subsequent zero-crossings, until said electrical load is removed, at which time the secondary current of said current-sampling transformer is insufficient to fire said triac at zero-crossings following the removal of said electrical load from said power transformer secondary.

BRIEF DESCRIPTION OF THE DRAWINGS

FIG. 1 is a circuit diagram which describes an embodiment of this invention.

FIGS. 2a—2h show graphs of current versus time and voltage versus time that are useful in explaining the operation of the circuit of FIG. 1.

DETAILED DESCRIPTION

As shown in FIG. 1, the AC source 1 is applied to power transformer T1 through terminals 2 and 3 of the series-connected two-terminal control and power switching circuit 4, the latter constituting the present invention. When switch S is closed, control circuitry to be described below causes triac Q to fire, enabling the AC source 1 to power the transformer-coupled load Z.

With switch S open and triac Q not conducting, a trickle of current (e.g., five microamperes, average) from the AC source 1 flows through resistors R3 and R8, diode D1, and current-sampling transformer T2, causing a charging of capacitor C. When capacitor C has been charged to the point where the voltage on C exceeds the sum of the breakdown voltages of zener diodes ZD1 and ZD2, current flows through resistor R1, producing a voltage drop between anode and gate of programmable unijunction transistor PUT1, causing PUT1 to switch from a nonconducting state to a conducting state. PUT1 fires only during a half-cycle that diode D1 conducts charging current to capacitor C, since, during those half-cycles that D1 is back-biased, the voltage on C does not increase, and therefore does not reach the firing voltage of PUT1. Silicon controlled rectifiers SCR1 and SCR2, and diodes D1, D2, and D3, constitute a gate circuit for control of current flow from the AC source through transformer T1 primary and resistors R7 and R8. During the half-cycle in which PUT1 begins to conduct, the anode of SCR1 is biased off and hence SCR1 does not conduct immediately when PUT1 fires. During and after the zero-crossing of AC source voltage following this firing of PUT1, PUT1 continues to conduct discharge current from capacitor C and fires SCR1 immediately after this zero-crossing. FIG. 2a indicates this PUT1 firing point as time $t_0$, and the beginning of conduction of SCR1 as time $t_1$. The turning on of SCR1 initiates the flow of a first test current pulse from the AC source 1 through the primary of transformer T1 and series-connected resistor R8, diode D2, resistor R7, SCR1, and transformer T2 primary. The turning on of SCR1 at time $t_1$ also causes bipolar junction transistor switch BJT1 to conduct, which in turn immediately forces PUT2 to switch to its conducting state. SCR1 conducts this first test current pulse as shown in FIG. 2b, until this current makes a zero-crossing at time $t_2$, and immediately thereafter is nonconducting, since its anode is then back-biased. PUT2 maintains its conduction of capacitor C discharge current through the zero-crossing at time $t_2$ and fires SCR2 essentially at $t_2$ as the anode of SCR2 begins to go positive. FIG. 2c shows the current through SCR2 for the case in which switch S is open. Said first test current pulse caused by the conduction of SCR1 from time $t_1$ to time $t_2$ and a second test current pulse resulting from the conduction of SCR2 from time $t_2$ to time $t_6$, for the case in which switch S is open, constitute a test cycle of AC source current as shown in FIG. 2f, and produce a voltage pulse pair at circuit node 5 as shown in FIG. 2d. (Circuit node 6 is the reference node for voltages observed at circuit nodes 5, 7, and 8.) Only a single voltage pulse is produced at circuit node 7 by said first and second test current pulses, due to the nonconduction of diode D3 when SCR1 conducts. The peak magnitude of said test cycle of AC source current is established by resistors R7 and R8. For common applications of this invention, it is chosen to be approximately 10% of the peak magnitude of the current that would flow through the primary of power transformer T1 if switch S were open and power transformer T1 were connected directly to the AC source. The repetition rate established for said test cycle of current is optimally governed by the application of this invention. One test cycle each half second is appropriate for common applications. The absence of a DC component in said test cycle of AC source current eliminates the possibility of magnetic saturation of the core of power transformer T1 during normal steady-state operation; however, the second half only of said test cycle of AC source current is used for amplitude testing because the reversal of current flow through power transformer T1 immediately prior to said amplitude test removes core saturation that may have developed as a result of a transient fluctuation or interruption of voltage provided by the AC source. The starting of said test cycle of AC source current at a zero-crossing of the AC source voltage and the termination of said test cycle of AC source current one cycle later at a zero-crossing eliminate the possibility of RFI (radio frequency interference) being generated by said test cycle of AC source current. The amplitude of the voltage pulse that occurs at node 7 determines which of two means for discharging capacitor C occurs. Typically, the peak amplitude of the voltage pulse that occurs at circuit node 7 is ten volts for the case in which switch S is open and fourteen volts for the case in which switch S is closed. When the voltage at circuit node 7 increases to a magnitude sufficient to cause current to flow through zener diode ZD3, which occurs each time said second test current pulse occurs, then BJT2 conducts, which immediately causes PUT3 to fire. This occurs at time $t_3$. Zener diode ZD4 also immediately conducts at time $t_3$, since its zener voltage has a value several volts less than the zener voltage of ZD3. The presence of zener diode ZD4 prevents the emitter-base junction of BJT3 from becoming forward-biased as long as the voltage at circuit node 7 exceeds the zener voltage of ZD4. If switch S is closed between test cycles of AC source current, or during the first three-quarters of a test cycle, and remains closed through the middle of the second half of said test cycle, then the voltage at circuit node 7 will reach a magnitude sufficient to cause zener diode ZD5 to conduct. This conduction by ZD5, which occurs at time $t_4$ in FIG. 2a, immediately causes BJT4, BJT5, SCR4, and SCR5 to conduct. This conduction of SCR4 and SCR5 rapidly discharges capacitor C into the control terminals of triac Q, thereby turning Q on. FIG. 2h graphs the voltage at circuit node 8 for the case where C is rapidly discharged through the control terminals of triac Q and switch S remains closed. If switch S is not closed before or during the time said second test current pulse occurs, then the voltage at circuit node 7 will not reach a magnitude sufficient to cause zener diode ZD5 to conduct. During the last half of said second test current pulse, if ZD5 has not been caused to conduct, the voltage at circuit node 7 progresses towards zero. When the voltage at the base of BJT3, which is the voltage at circuit node 7 applied through resistor R18, falls a fraction of a volt below the emitter voltage of BJT3, which is held at the breakdown voltage of zener diode ZD4, then BJT3 conducts, which immediately causes SCR3 to conduct. Conduction of SCR3 causes rapid discharge of capacitor D at time $t_5$ in FIG. 2a. R20 limits the magnitude of this discharge current. FIG. 2g graphs the voltage at circuit node 8 for instances when C is rapidly discharged by SCR3. When C is discharged by either of the above-described means, then PUT1, PUT2, and PUT3 revert to their nonconductive states. The switching of zener diode ZD1 to its nonconducting state when capacitor C is discharged, insures that residual charge on C and trickle current through resistor R3 do not prevent this reversion.

The closing of switch S leads to the flow of a single pulse of capacitor C discharge current into the control terminal of triac Q as described above. This current pulse fires triac Q which consequently connects the AC source 1, for less than one-half cycle of AC source current, to series-connected primary windings of transformers T1 and T2. The resulting relatively large current flowing from the AC source 1 through the primary of current-sampling transformer T2 for a fraction of a cycle, induces a pulse of current in the secondary of T2 which flows into the control terminal of triac Q. This pulse of current induced in the secondary of T2 has sufficient amplitude and is delayed sufficiently by the inductance of transformer T2, to cause triac Q to fire at the zero-crossing of the AC source voltage which follows said pulse of capacitor C discharge current. The resulting half-cycle of current flow from the AC source 1 through the triac Q, T1 primary, and T2 primary, again causes a delayed current to flow from T2 secondary through the input terminals of triac Q so as to fire triac Q following the next zero-crossing. This feedback of current maintains triac Q in a conductive state as long as switch S remains closed, and since the voltage drop across the primary of current transformer T2 is typically less than one volt under load conditions, practically the entire voltage of the AC source is applied to the primary of power transformer T1 while switch S is closed. When S is opened, the magnitude of the current through transformer T2 is then insufficient to fire triac Q, whereupon Q ceases to conduct at the next zero-crossing. When triac Q ceases to conduct, the trickle charging of capacitor C resumes immediately thereafter as described above. However, if capacitor C is discharged by SCR3, as a consequence of switch S remaining open, as described above, then the trickle charging of capacitor C also resumes immediately thereafter. This trickle charging of C begins a new cycle of oscillatory action whereby the attainment of a threshold voltage on capacitor C again causes a single cycle of current to flow from the AC source 1 through the primary of transformer T1; its magnitude is again tested, and is again followed by the discharge of C into the control terminal of triac Q or across resistor R20, as described above.

I claim:
1. A power transformer controlling circuit comprising
   a triac for controlling the flow of electric current from an AC source to the primary winding of a power transformer,
   an electrical load connected through a controlling switch to the secondary winding of said power transformer,
   a means for allowing a test current, having a magnitude which varies directly with the input admit- tance of said power transformer, and is small relative to the magnitude of the current that would flow through the primary of said power transformer if said AC source were connected directly and exclusively to said power transformer, to flow from the AC source through the primary winding of said power transformer while said triac is not conducting, a means for firing said triac if the magnitude of said test current exceeds a first threshold, said first threshold having a value greater than the magnitude of the current that flows through the primary of said power transformer if said electrical load is not connected to the secondary of said power transformer, but less than the magnitude of the current that flows through said power transformer when said electrical load is connected to the secondary of said power transformer, and a means for sustaining conduction of said triac, once fired, for the duration of the time that said electrical load remains connected to the secondary winding of said power transformer.

2. The invention described in claim 1 wherein said invention is configured to be an electrical network having only two terminals for external electrical connections.

3. A power transformer controlling circuit comprising a triac for controlling the flow of electric current from an AC source to the primary winding of a power transformer, an electrical load, connected through a controlling switch, to the secondary winding of said power transformer, a means for periodically allowing a test pulse of current, having a magnitude which varies directly with the input admittance of said power transformer, and having a peak magnitude which is small relative to the peak magnitude of the current that would flow through the primary of said power transformer if said AC source were connected directly and exclusively to said power transformer, to flow from the AC source through the primary winding of said power transformer while said triac is not conducting, a means for firing said triac if said test pulse of current exceeds a first threshold, said first threshold having a value greater than the peak current that flows through the primary of said power transformer if said electrical load is not connected to the secondary of said power transformer but less than the peak current that flows through the primary of said power transformer when said electrical load is connected across the secondary of said power transformer, and a means for sustaining conduction of said triac, once fired, if each half-cycle of current through said triac has a peak magnitude sufficient to exceed a second threshold, said second threshold having a value greater than the peak magnitude of the current that would flow through the primary of said power transformer if said AC source were connected directly to the primary of said power transformer with said electrical load not connected to the secondary of said power transformer, and less than the peak magnitude of the current that flows through the primary of said power transformer when the triac is conducting and said electrical load is connected to the secondary of said power transformer.

4. The invention described in claim 3 wherein said invention is configured to be an electrical network having only two terminals for external connections.

5. The invention described in claim 3 wherein said means for sustaining conduction of said triac comprises a current-sampling transformer having a primary winding in series with series-connected triac, power transformer primary winding, and AC source; said current-sampling transformer having a secondary winding operably connected across the control terminals of said triac so as to provide delayed voltage and current, which if the peak magnitude of AC source current exceeds said second threshold prior to a zero-crossing, would have sufficient amplitudes immediately following this zero-crossing to cause said triac to switch immediately to its conducting state, thereby effectively sustaining the triac in its conducting state for as long as the peak value of each half-cycle of said AC source current exceeds said second threshold.

6. The circuit of claim 3 wherein said means for periodically allowing a test pulse of current to flow through the primary winding of said power transformer while said triac is not conducting, comprises a gate circuit series connected to a resistive branch together in series with the primary of said power transformer and said AC source, wherein said gate circuit is periodically closed, for an interval of time which is short relative to the time interval between test pulses of current, by a signal from an oscillator circuit, thereby allowing current, heretofore referred to as test pulse of current, to flow from said AC source through series-connected said gate circuit, said resistive branch, and the primary winding of said power transformer.

7. The invention as expressed in claim 6 wherein oscillator circuit comprises a capacitor and means for slowly charging said capacitor from said AC source;

a threshold detector circuit, which, when the voltage on said capacitor has reached an oscillator threshold value, causes closure of said gate circuit at the subsequent first zero-crossing of the voltage of said AC source, thereby initiating the flow of said test pulse of current through said resistive branch;

a means to maintain closure of said gate circuit through a second zero-crossing which immediately follows said first zero-crossing, thereby permitting the flow of a second half-cycle of said test pulse of current from said AC source;

a means to rapidly discharge said capacitor just prior to the time for completion of said test pulse of current in those instances when the peak amplitude of said test pulse of current is less than the value of said first threshold; and a means for momentarily disconnecting from said capacitor, bistable switching devices prone to remaining in a conducting state after the rapid discharge of said capacitor.

8. The invention expressed in claim 7 wherein said capacitor performs not only the function of a relaxation oscillator capacitor, but also the function of triac trigger pulse capacitor.

9. The invention expressed in claim 7 wherein said threshold detector circuit comprises a zener diode in series with a resistor, both operably connected to a programmable unijunction transistor, so that when the voltage on said capacitor increases to a value sufficient to cause said zener diode and said resistor to conduct, then the resulting voltage across said resistor causes said programmable unijunction transistor to fire, which in turn causes said gate circuit to close.

10. The invention as expressed in claim 3 wherein gating and memory means cause said test pulse of current to start at a zero-crossing and end one cycle later at a zero-crossing, thereby constituting a test cycle of AC source current.

11. The invention expressed in claim 10 wherein gating means prevents the effective comparison of the instantaneous magnitude of the absolute value of said test cycle of AC source current with said first threshold, until after the zero-crossing that occurs midway through said test cycle of AC source current.

* * * * *